(12) United States Patent
Chernobieff et al.

(10) Patent No.: US 11,178,385 B2
(45) Date of Patent: Nov. 16, 2021

(54) SYNTHETIC STEREOSCOPIC CONTENT CAPTURE

(71) Applicant: Google LLC, Mountain View, CA (US)

(72) Inventors: Jeremy Chernobieff, Mountain View, CA (US); Houman Meshkin, Mountain View, CA (US); Scott Dolim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/829,656

(22) Filed: Mar. 25, 2020

(65) Prior Publication Data

US 2020/0228786 A1 Jul. 16, 2020

Related U.S. Application Data

(62) Division of application No. 15/965,526, filed on Apr. 27, 2018, now Pat. No. 10,645,370.

(Continued)

(51) Int. Cl.
*H04N 13/279* (2018.01)
*H04N 13/383* (2018.01)
(Continued)

(52) U.S. Cl.
CPC .......... *H04N 13/279* (2018.05); *G06T 15/00* (2013.01); *H04N 13/275* (2018.05); *H04N 13/383* (2018.05)

(58) Field of Classification Search
None
See application file for complete search history.

(56) References Cited

U.S. PATENT DOCUMENTS 5,748,199 A * 5/1998 Palm .................... H04N 13/133
345/473
9,619,105 B1 * 4/2017 Dal Mutto .............. G06F 3/011
(Continued)

OTHER PUBLICATIONS

Lucas et al., "An Iterative image registration technique with an application to stereo vision," Int. Joint Conf. on Artificial Intelligence—vol. 2, pp. 674-679, 1981. (Year: 1981).*
(Continued)

*Primary Examiner* — Reza Aghevli
(74) *Attorney, Agent, or Firm* — Brake Hughes Bellermann LLP

(57) ABSTRACT

Systems, methods, and computing devices for capturing synthetic stereoscopic content are provided. An example computing device includes at least one processor and memory. The memory stores instructions that cause the computing device to receive a three-dimensional scene. The instructions may additionally cause the computing device to reposition vertices of the three-dimensional scene to compensate for variations in camera location in a directional stereoscopic projection and generate a stereoscopic image based on the repositioned vertices. An example method includes projecting a three-dimensional scene onto a left eye image cube and a right eye image cube and repositioning vertices of the three-dimensional scene to adjust for rendering from a single camera location. The method also includes mapping pixels of a stereoscopic image to points on the left eye image cube and the right eye image cube and generating the stereoscopic image using the values of the mapped pixels.

17 Claims, 11 Drawing Sheets

Related U.S. Application Data

(60) Provisional application No. 62/491,201, filed on Apr. 27, 2017.

(51) Int. Cl.
*G06T 15/00* (2011.01)
*H04N 13/275* (2018.01)

(56) References Cited

U.S. PATENT DOCUMENTS

| | | | | |
|---|---|---|---|---|
| 10,645,370 B2* | 5/2020 | Chernobieff | | H04N 13/383 |
| 2001/0026276 A1* | 10/2001 | Sakamoto | | G01C 21/3694 |
| | | | | 345/473 |
| 2004/0247174 A1* | 12/2004 | Lyons | | G06T 17/10 |
| | | | | 382/154 |
| 2005/0083248 A1* | 4/2005 | Biocca | | H04N 13/194 |
| | | | | 345/8 |
| 2007/0279412 A1* | 12/2007 | Davidson | | H04N 13/261 |
| | | | | 345/419 |
| 2007/0279415 A1* | 12/2007 | Sullivan | | H04N 13/275 |
| | | | | 345/427 |
| 2007/0297645 A1* | 12/2007 | Pace | | G06K 9/6203 |
| | | | | 382/103 |
| 2008/0070684 A1* | 3/2008 | Haigh-Hutchinson | | |
| | | | | A63F 13/5375 |
| | | | | 463/32 |
| 2012/0162214 A1* | 6/2012 | Chavez | | H04N 13/111 |
| | | | | 345/419 |
| 2012/0176473 A1* | 7/2012 | Genova | | H04N 13/122 |
| | | | | 348/46 |
| 2013/0002815 A1* | 1/2013 | Smoot | | H04N 13/366 |
| | | | | 348/43 |
| 2013/0021445 A1* | 1/2013 | Cossette-Pacheco | | |
| | | | | G06T 15/40 |
| | | | | 348/46 |
| 2013/0083021 A1* | 4/2013 | Cohen | | G06T 17/00 |
| | | | | 345/420 |
| 2013/0184064 A1* | 7/2013 | Manning | | G07F 17/3237 |
| | | | | 463/25 |
| 2014/0111623 A1* | 4/2014 | Zhao | | H04N 13/128 |
| | | | | 348/47 |
| 2014/0253552 A1* | 9/2014 | Agarwala | | G06T 5/006 |
| | | | | 345/427 |
| 2014/0303491 A1* | 10/2014 | Shekhar | | A61B 1/0005 |
| | | | | 600/424 |
| 2014/0306950 A1* | 10/2014 | Russi | | G01S 13/933 |
| | | | | 345/419 |
| 2014/0313190 A1* | 10/2014 | Vesely | | G06T 15/06 |
| | | | | 345/419 |
| 2015/0116465 A1* | 4/2015 | Wang | | H04N 13/261 |
| | | | | 348/51 |
| 2015/0358613 A1* | 12/2015 | Sandrew | | G06T 15/205 |
| | | | | 348/36 |
| 2016/0014391 A1* | 1/2016 | Hosenpud | | H04N 13/366 |
| | | | | 348/46 |
| 2016/0143693 A1* | 5/2016 | Yilmaz | | A61B 6/5235 |
| | | | | 600/424 |
| 2017/0018121 A1* | 1/2017 | Lawson | | G06T 17/00 |
| 2017/0039765 A1* | 2/2017 | Zhou | | G06T 7/55 |
| 2017/0178408 A1* | 6/2017 | Bavor, Jr. | | G06F 3/013 |
| 2017/0221226 A1* | 8/2017 | Shen | | G06T 7/80 |
| 2017/0374344 A1* | 12/2017 | Boulton | | H04N 13/398 |
| 2018/0144556 A1* | 5/2018 | Champion | | G06F 3/0346 |
| 2018/0234669 A1* | 8/2018 | Chen | | H04N 13/221 |
| 2018/0285481 A1* | 10/2018 | Czmyrid | | G06T 15/04 |
| 2019/0385352 A1* | 12/2019 | Varekamp | | G06T 15/205 |
| 2020/0143554 A1* | 5/2020 | Toldo | | G06T 7/521 |

OTHER PUBLICATIONS

Tomasi et al., "Detection and tracking of point features," School of Computer Science, Carnegie Mellon University, Pittsburg, PA, pp. 1-38, Apr. 1991, CMU-CS-91-132 (Year: 1991).*
International Search Report and Written Opinion for PCT Application No. PCT/US2018/029952, dated Jul. 30, 2018, 21 pages.
"Rendering Omni-directional Stereo Content", Google Inc., retrieved on Apr. 24, 2017 from https://developers.google.com/vr/jump/rendering-ods-content.pdf, 11 pages.

* cited by examiner

SYNTHETIC STEREOSCOPIC CONTENT CAPTURE

CROSS-REFERENCE TO RELATED APPLICATIONS

This application is a divisional of, and claims priority to, U.S. patent application Ser. No. 15/965,526, filed on Apr. 27, 2018, entitled "SYNTHETIC STEREOSCOPIC CONTENT CAPTURE", which claims priority to U.S. Provisional Patent Application No. 62/491,201, filed on Apr. 27, 2017, the disclosures of which are incorporated herein by reference in their entireties.

BACKGROUND

Omni-directional stereo (ODS) is a projection model for 360-degree stereoscopic videos. ODS may be used with a head-mounted display (HMD) to display stereoscopic imagery. With ODS, 360-degree stereoscopic videos can be stored, edited, and transmitted using conventional video formats and tools. In ODS, a frame is divided horizontally into a left-eye image on top and a right-eye image on bottom. The images for both the left eye and right eye are 360-degree images that include the entire field of view as mapped to a two dimensional (2D) surface using an equirectangular projection.

There are various sources for 360-degree stereoscopic video content. For example, one source of 360-degree stereoscopic video content is a physical 360-degree camera rig. Another source of 360-degree stereoscopic video content is three-dimensional (3D) rendering engines, including game engines, that can generate synthetic worlds. In some embodiments, 360-degree stereoscopic video is live streamed to, for example, let others share a virtual reality (VR) experience or follow along during video gaming.

Traditional techniques for capturing 360-degree stereoscopic video from synthetic sources like game engines can be complex, time consuming, and error prone for content developers and may be completely inaccessible for regular users.

SUMMARY

This document relates, generally, to techniques for capturing synthetic stereoscopic content. For example, the synthetic stereoscopic content may be generated by a video gaming engine and streamed to viewers.

One aspect is a computing device that includes at least one processor and memory. The memory stores instructions that, when executed by the at least one processor, cause the computing device to receive a three-dimensional scene. The instructions may additionally cause the computing system to reposition vertices of the three-dimensional scene to compensate for variations in camera location in a directional stereoscopic projection and generate a stereoscopic image based on the repositioned vertices.

Another aspect is a method that includes projecting a three-dimensional scene onto a left eye image cube and a right eye image cube and repositioning vertices of the three-dimensional scene to adjust for rendering from a single camera location. The method also includes generating a stereoscopic image by determining values for pixels of the stereoscopic image based on the left eye image cube and the right eye image cube.

Another aspect is a method that includes projecting a three-dimensional scene onto an equirectangular cylinder and determining left offset vectors and right offset vectors for vertices of the projected three-dimensional scene. The method also includes duplicating the projected three-dimensional scene to generate a duplicated scene and offsetting the vertices of the duplicate scene by a uniform offset amount. The method also includes applying the left offset vectors to the vertices of at least one of the projected three-dimensional scene and the duplicate scene, generating homogeneous coordinates for the vertices of the projected three-dimensional scene and the duplicate scene, and projecting the vertices of the projected three-dimensional scene and the duplicate scene to generate a stereoscopic image.

DETAILED DESCRIPTION

Figure 1:
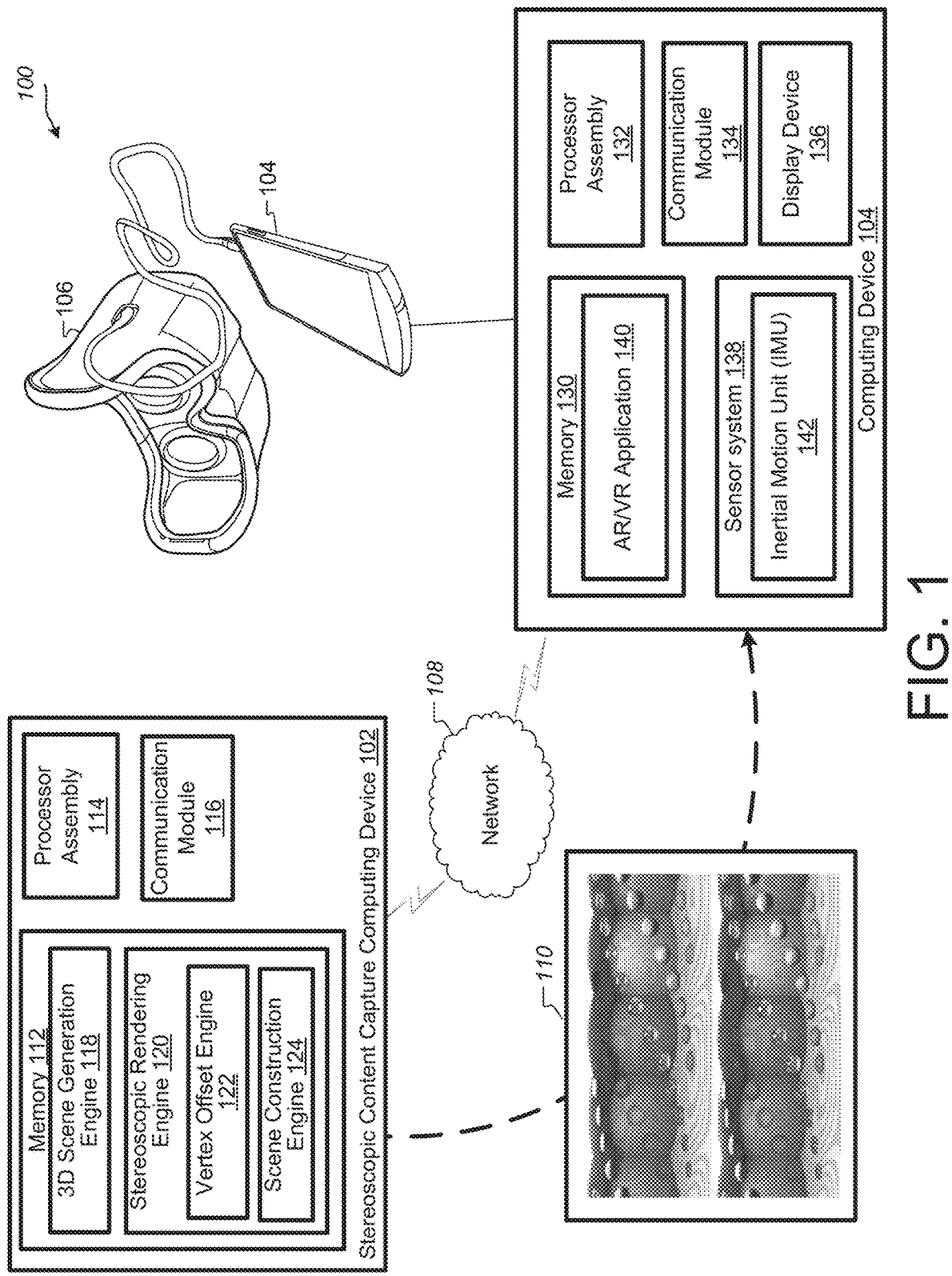
FIG. 1 is a block diagram illustrating a system according to an example implementation.

This disclosure provides techniques for improving the efficiency of capturing stereoscopic wide field of view video capture in three-dimensional rendering engines, such as game engines. For example, the techniques described herein may be used to capture 180-degree stereoscopic video or 360-degree stereoscopic video. The techniques described herein may, for example, reduce the number of processor cycles and the amount of time required to capture wide field of view stereoscopic content. These techniques may be used, for example, to live stream wide field of view synthetic stereoscopic content from video games and/or other sources.

For example, the stereoscopic content may use a directional stereoscopic projection. In a directional stereoscopic projection, a left-eye and a right-eye image are generated based on an inter-pupillary distance (IPD)

(e.g., the left-eye image is generated from a position that is offset in a first direction from a virtual camera position by half the IPD and the right-eye image is generated from a position that is offset in a second direction that is opposite of the first direction). The directions of the offsets from the camera position are orthogonal to the direction in which the camera is aimed. In an directional stereoscopic projection, each vertical column of pixels in an images is rendered as though a camera was aimed directly at the column (i.e., the camera is rotated horizontally to aim at the column). As the camera rotates, the positions used to capture the right-eye image and the left-eye image change, much like a head rotation causes the positions of the eyes to move. In fact, the positions used to capture the right-eye image and the left-eye image rotate along a circle having a diameter equal to the IPD. An example of a directional stereo projection is an omni-directional stereoscopic projection, which has a 360 degree field of view. However, a directional stereoscopic projection can also have a narrower field of field. For example, the VR180 file format uses a directional stereoscopic projection with a 180-degree field of view. Other implementations include other fields of view too.

Conventional three-dimensional scene rendering techniques use a fixed camera location and thus cannot produce content with a directional stereoscopic projection without performing many separate renderings (e.g., one for each camera position). Implementations described herein can generate stereoscopic content with a directional stereoscopic projection with fewer renderings by offsetting the locations of vertices to compensate for the changing camera position in a directional stereoscopic projection, allowing an image to be rendered with a directional stereoscopic projection from a single camera location. In some implementations, the position of the camera that would be used to capture each vertex in a directional stereoscopic projection is determined and used to calculate an offset for the vertex. For example, each vertex in the scene may be offset slightly to a position that has the same positional relationship with a central camera location as the vertex originally had with the camera that would capture the vertex in a directional stereoscopic projection. The vertex offset can be calculated and applied efficiently using one or more of a vertex shader and a geometry shader of a graphics processor unit (GPU). Implementations may allow for rendering directional stereo content in much less time and using fewer processor cycles than conventional rendering techniques. For example, some implementations allow for real-time capture of directional stereoscopic content, allowing for real-time streaming of video game and virtual reality content.

At least some implementations of VR systems and AR systems include a head-mounted display device (HIVID) that can be worn by a user to generate an immersive environment for the user. Examples of an immersive environment include a VR environment generated by a VR system and an AR environment generated by an AR system. In at least some implementations, the HIVID includes a stereoscopic display in which different images and/or videos are shown to each of the user's eyes to convey depth. The HMD may display images that cover some (AR) or all (VR) of a user's field of view. The HIVID may also track the movement of the user's head and/or pupil location. As the user's head moves, the HIVID may display updated images that correspond to the user's changing orientation and/or position within the AR or VR environment.

The content displayed on the HIVID may be received from various sources. For example, the content may be from a wide field of view stereoscopic video file such as a 360-degree stereoscopic video file or a 180-degree stereoscopic video file. An example of a 360-degree stereoscopic file format is the ODS file format. An example of a 180-degree stereoscopic file format is the VR180 file format. Stereoscopic video files may be generated from physical stereoscopic camera rigs or from synthetic stereoscopic capture engines.

FIG. 1 is a block diagram illustrating a system 100 according to an example implementation. The system 100 captures stereoscopic content, such as stereoscopic image and video content. In some implementations, the system 100 also generates an immersive environment, such as an AR environment or VR environment, based on the stereoscopic content for a user of the system 100. In some implementations, the system 100 includes a stereoscopic content capture computing device 102, a computing device 104, and a head-mounted display device (HIVID) 106. Also shown is a network 108 over which the stereoscopic content capture computing device 102 can communicate with the computing device 104 to, for example, transmit stereoscopic content 110.

The stereoscopic content capture computing device 102 may be any type of computing device, including a server, a personal computer such as a desktop or laptop computer, a gaming console, a tablet, a mobile device (e.g., a smartphone), or a cloud-based computing device. The stereoscopic content capture computing device 102 is configured to capture synthetic stereoscopic content, such as wide field of view stereoscopic images and video. The computing device 104 may include a memory 112, a processor assembly 114, and a communication module 116. The memory 112 may include a 3D scene generation engine 118 and a stereoscopic rendering engine 120. The computing device 104 may also include various user input components (not shown) such as keyboards, mice, joysticks, handheld controllers, steering wheels, foot pedals, and microphones.

The 3D scene generation engine 118 generates a 3D scene that can be rendered by the stereoscopic rendering engine 120. For example, 3D scene may include multiple polygonal meshes formed from planar faces (e.g., triangles) defined by vertices that represent the 3D coordinates of a corner of the planar face. The polygonal meshes of the 3D scene may also define color, texture, and transparency information associated with the planar faces or vertices. The 3D scene can also include light information such as ambient light sources and point light sources. The 3D scene may also define a camera location and orientation with the scene. In some implementations, the 3D scene generation engine 118 is a gaming engine. For example, the polygonal meshes may define a virtual world within which a character controlled by the user of the gaming engine may move. In some implementations, as the character moves within the virtual world, the camera position and orientation is altered such that the camera represents the character's view of the virtual world. Other examples of the 3D scene generation engine 118 include computer aided drafting systems and virtual painting or sculpting systems.

The stereoscopic rendering engine 120 captures stereoscopic content from the 3D scene. For example, the stereoscopic rendering engine 120 may render the 3D scene as a stereoscopic image using an ODS projection. In an ODS projection, a left-eye and a right-eye image are generated based on an inter-pupillary distance (IPD) (e.g., the left-eye image is generated from a position that is offset in a first direction from the virtual camera position by half the IPD and the right-eye image is generated from a position that is offset in a second direction that is opposite of the first direction). The directions of the offsets from the camera position are orthogonal to the direction in which the camera is aimed. In an ODS projection, each vertical column of pixels in an images is rendered as though a camera was aimed directly at the column (i.e., the camera is rotated horizontally to aim at the column). This means that directions of the offsets, and in turn the positions, used to generate the left-eye image and the right-eye image change for each vertical column of pixels.

Figure 2A:
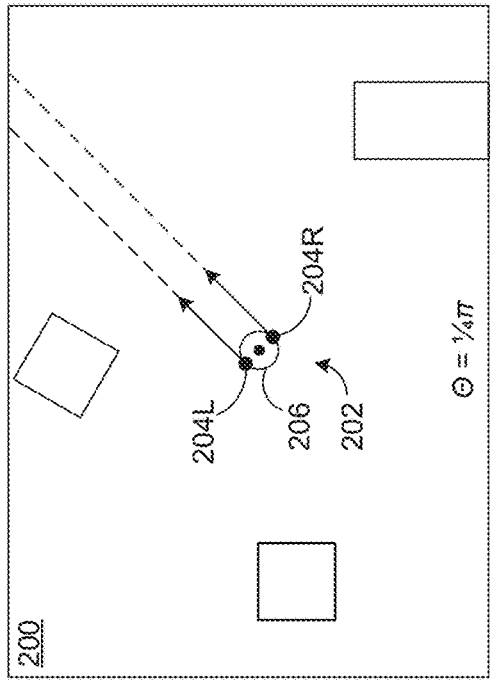
FIGS. 2A-2D are schematic diagrams of example overhead views of a scene with a virtual camera assembly in various rotations.

FIGS. 2A-2D show schematic diagrams of example overhead views of a scene 200 with a virtual camera assembly 202 that is rotated in different directions. In FIG. 2A, the virtual camera assembly 202 is rotated to Θ=0. The virtual camera assembly 202 includes a left-eye camera 204L and a right-eye camera 204R that are used to generate the stereoscopic image at Θ=0. Both the left-eye camera 204L and the right-eye camera 204R are oriented in the same direction (i.e., rotated to Θ=0). The left-eye camera 204L is offset from the center of the virtual camera assembly 202 by half of the IPD in a direction orthogonal to the orientation of the camera. Similarly, the right-eye camera 204R is offset from the center of the virtual camera assembly 202 by half of the IPD in the opposite direction. As can be seen, rays projected out from the left-eye camera 204L and the right-eye camera 204R may intersect different portions of the scene 200.

Figure 2B:
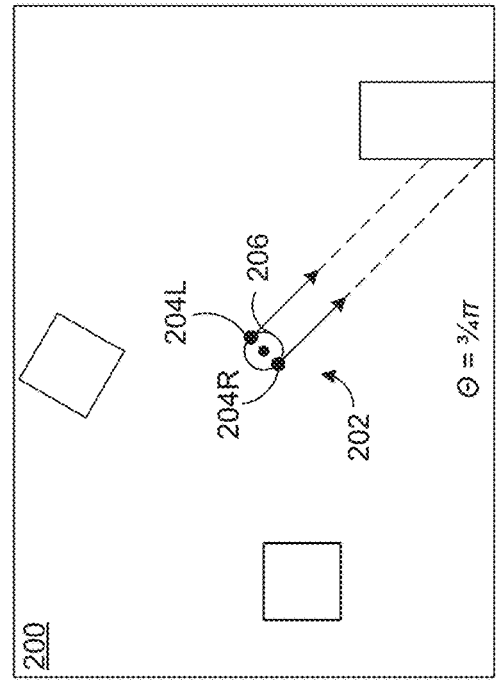
Figure 2C:
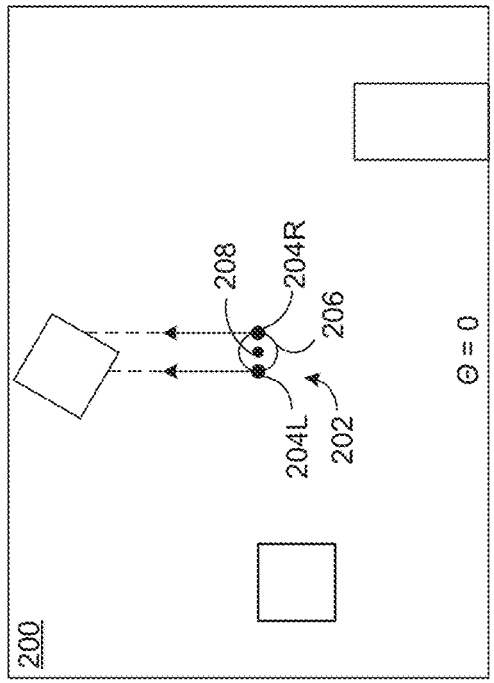
Figure 2D:
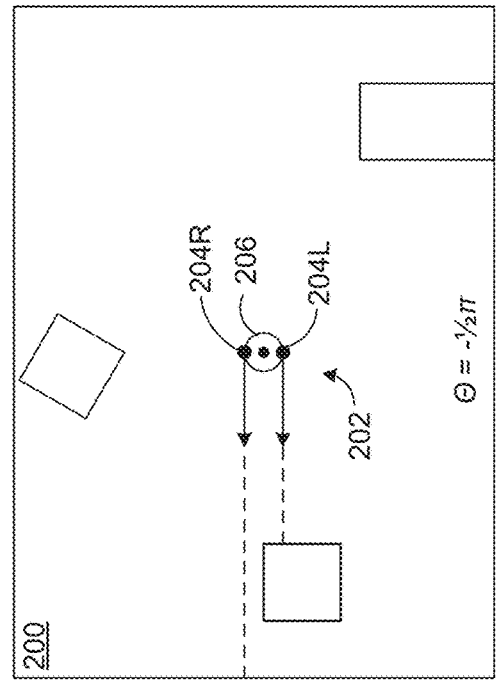

FIG. 2B shows the scene 200 with the virtual camera assembly 202 rotated to Θ=¼π. FIG. 2C shows the scene 200 with the virtual camera assembly 202 rotated to Θ=−½π. FIG. 2D shows the scene 200 with the virtual camera assembly 202 rotated to Θ=¾π. As can be seen in these figures, the left-eye camera 204L and the right-eye camera 204R move along a virtual pupillary circle 206 having a radius of half the IPD centered at a center point 208. At each position, the left-eye camera 204L and the right-eye camera 204R are oriented at an angle tangent to the virtual pupillary circle.

Figure 3:
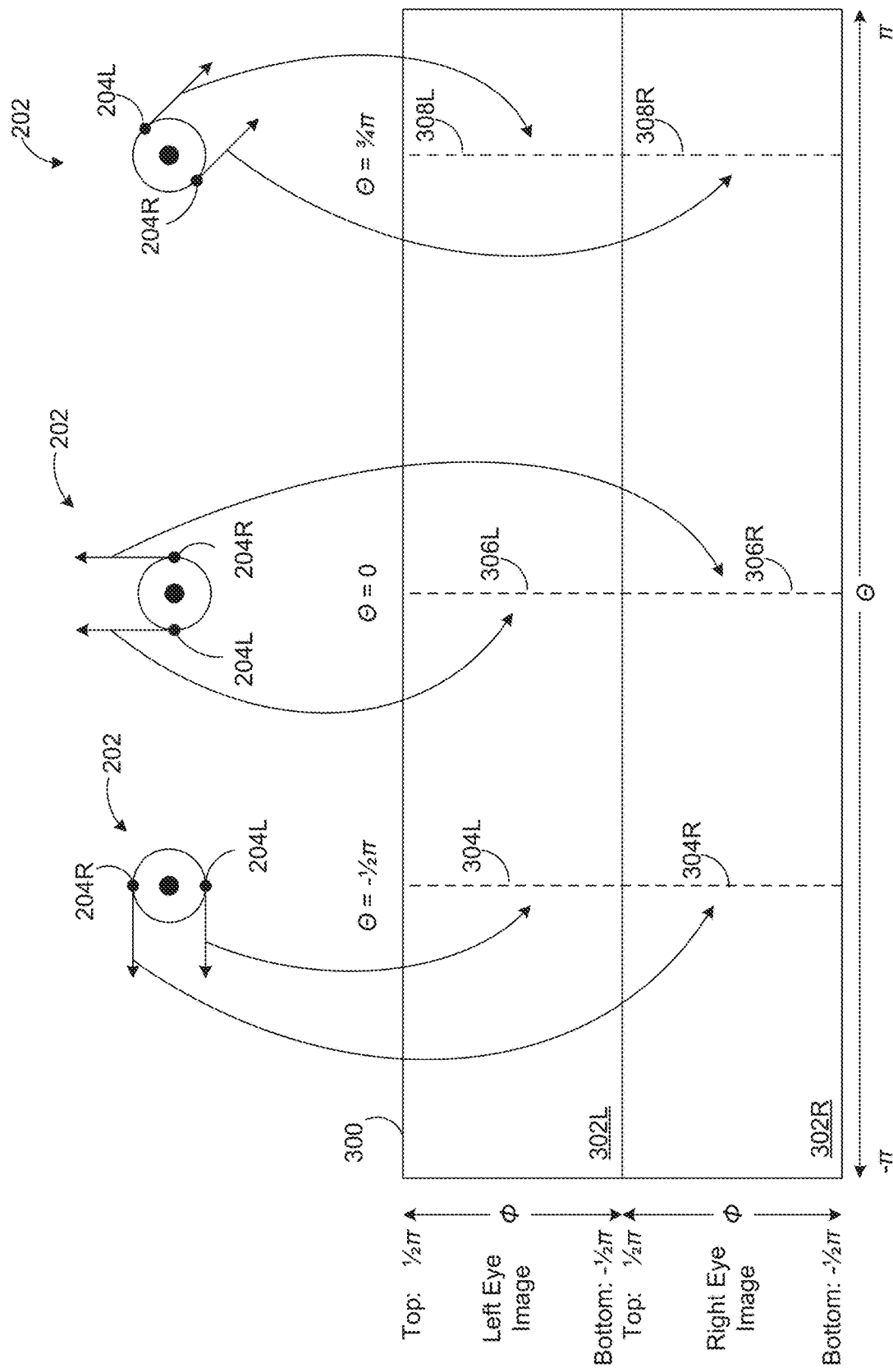
FIG. 3 is a schematic diagram that illustrates the composition of an example ODS format image file, in accordance with implementations described herein.

FIG. 3 is a schematic diagram of the composition of an example ODS format image file 300 generated by embodiments herein. The image file 300 includes a left-eye image portion 302L and a right-eye image portion 302R. The left-eye image portion 302L is stacked vertically on top of the right-eye image portion 302R. For example, the ODS format image file 300 may have a resolution of 4096×4096 pixels. The left-eye image portion 302L may be the upper 4096×2048 pixels of the image file 300 and the right-eye image portion 302R may be the lower 4096×2048 pixels of the image file 300. Each of the image portions may, for example, include an equirectangular projection of the 3D scene. For example, the bottom row of pixels in either of the image portions corresponds to the portion of the 3D scene directly below the virtual camera assembly 202, the middle row of pixels in either of the image portions corresponds to the portion of the 3D scene straight in front of the virtual camera assembly 202 (i.e., at the same vertical position as the camera), and the upper row of pixels in either image portion corresponds to the portion of the 3D scene directly above the virtual camera assembly 202. Within each of the image portions, the horizontal position of the pixels is mapped to rotation angle for the virtual camera assembly 202.

In some implementations, a full rotation (e.g., 2π (360°) of rotation) of the virtual camera assembly 202 is mapped across the columns of the pixels. For example, the pixels in the first column of each of the image portions may correspond to the portion of the scene captured when the virtual camera assembly 202 is oriented at an angle of −π, the pixels in the middle column of each of the image portions may correspond to the portion of the scene captured when the virtual camera assembly 202 is oriented at an angle of 0, and the last column of pixels of each of the image portions may correspond to the portion of the scene captured when the virtual camera assembly 202 is oriented at an angle of π.

To illustrate this mapping, a left pixel column 304L, a left pixel column 306L, and a left pixel column 308L of the left-eye image portion 302L are shown. Additionally, a right pixel column 304R, a right pixel column 306R, and a right pixel column 308R of the right-eye image portion 302R are shown. The left pixel column 304L and the right pixel column 304R are captured by the left-eye camera 204L and the right-eye camera 204R respectively when the virtual camera assembly 202 is oriented at an angle of Θ=−½π. (i.e., as shown in FIG. 2C). The left pixel column 306L and the right pixel column 306R are captured by the left-eye camera 204L and the right-eye camera 204R respectively when the virtual camera assembly 202 is oriented at an angle of Θ=0 (i.e., as shown in FIG. 2A). The left pixel column 308L and the right pixel column 308R are captured by the left-eye camera 204L and the right-eye camera 204R respectively when the virtual camera assembly 202 is oriented at an angle of Θ=¾π (i.e., as shown in FIG. 2D). Of course, there are many pixel columns between these examples that are not shown in this figure. As this figure illustrates, both the position and the orientation of the left-eye camera 204L and the right-eye camera 204R change for each pixel column.

Figure 4:
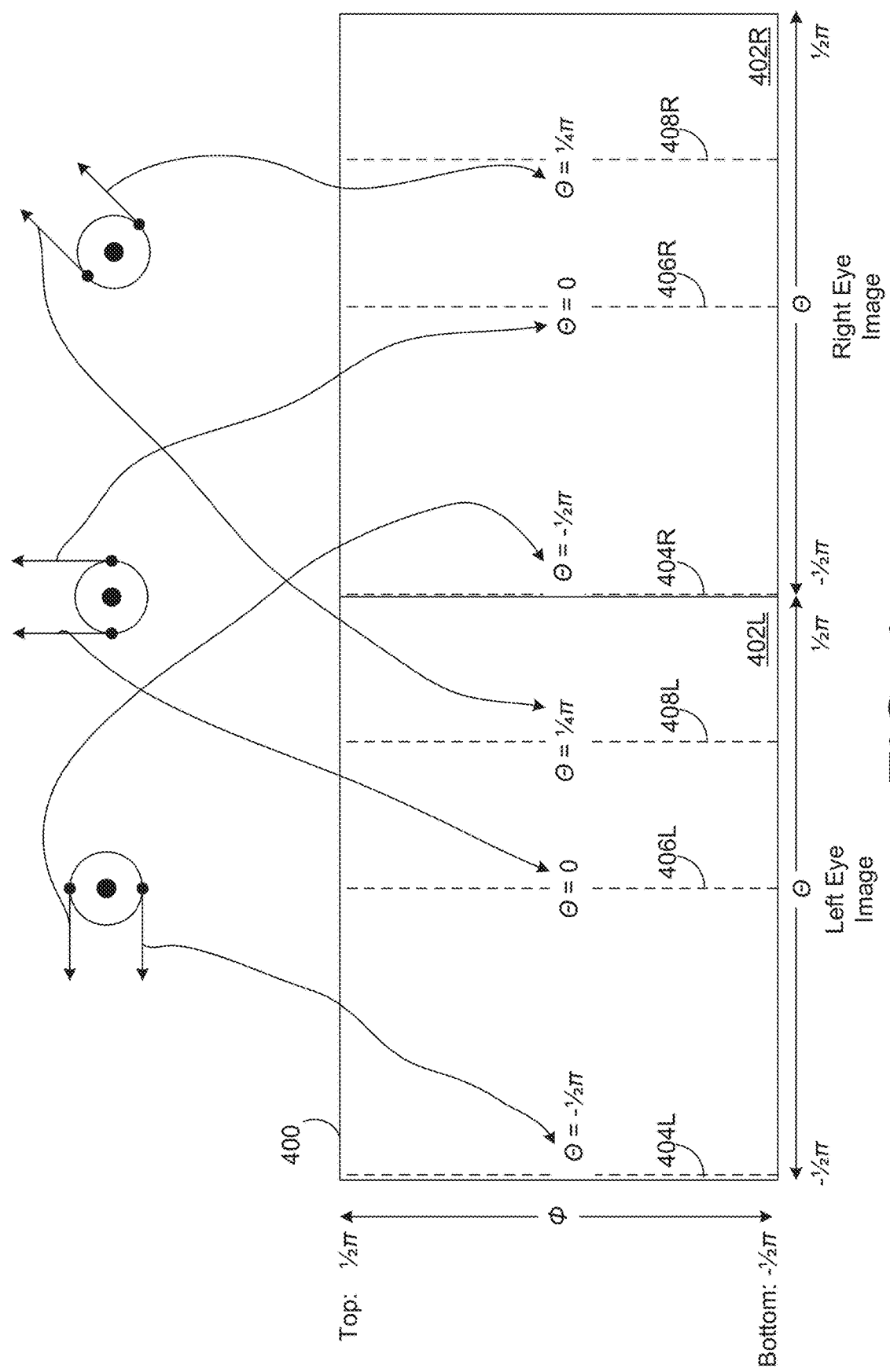
FIG. 4 is a schematic diagram of the composition of an example VR180 format image file, in accordance with implementations described herein.

FIG. 4 is a schematic diagram of the composition of an example VR180 format image file 400. The image file 400 includes a left-eye image portion 402L and a right-eye image portion 402R. The left-eye image portion 402L and the right-eye image portion 402R are positioned side-by-side. For example, the VR180 format image file 400 may have a resolution of 3840×2160 pixels. The left-eye image portion 402L may be the left 1920×2160 pixels of the image file 400 and the right-eye image portion 402R may be the right 1920×2160 pixels of the image file 400. Each of the image portions may, for example, include an equirectangular projection of the 3D scene. Similar to the image file 300, the bottom row of pixels in either of the image portions corresponds to the portion of the 3D scene directly below the virtual camera assembly 202, the middle row of pixels in either of the image portions corresponds to the portion of the 3D scene straight in front of the virtual camera assembly 202 (i.e., at the same vertical position as the camera), and the upper row of pixels in either image portion corresponds to the portion of the 3D scene directly above the virtual camera assembly 202.

Within each of the image portions, the horizontal position of the pixels is mapped to rotation angle for the virtual camera assembly 202. In some implementations, a half rotation (e.g., π (180°) of rotation) of the virtual camera assembly 202 is mapped across the columns of the pixels in each image portion. For example, the pixels in the first column of each of the image portions may correspond to the portion of the scene captured when the virtual camera assembly 202 is oriented at an angle of −½π, the pixels in the middle column of each of the image portions may correspond to the portion of the scene captured when the virtual camera assembly 202 is oriented at an angle of 0, and the last column of pixels of each of the image portions may correspond to the portion of the scene captured when the virtual camera assembly 202 is oriented at an angle of ½π.

To illustrate this mapping, a left pixel column 404L, a left pixel column 406L, and a left pixel column 408L of the left-eye image portion 402L are shown. Additionally, a right pixel column 404R, a right pixel column 406R, and a right pixel column 408R of the right-eye image portion 402R are shown. The left pixel column 404L and the right pixel column 404R are captured by the left-eye camera 204L and the right-eye camera 204R respectively when the virtual camera assembly 202 is oriented at an angle of Θ=-½π (i.e., as shown in FIG. 2C). The left pixel column 406L and the right pixel column 406R are captured by the left-eye camera 204L and the right-eye camera 204R respectively when the virtual camera assembly 202 is oriented at an angle of Θ=0 (i.e., as shown in FIG. 2A). The left pixel column 408L and the right pixel column 408R are captured by the left-eye camera 204L and the right-eye camera 204R respectively when the virtual camera assembly 202 is oriented at an angle of Θ=¼π (i.e., as shown in FIG. 2B). Of course, there are many pixel columns between these examples that are not shown in this figure.

As FIGS. 3 and 4 illustrate, both the position and the orientation of the left-eye camera 204L and the right-eye camera 204R change for each pixel column in the example images 300 and 400. This changing camera position is not typical when rendering 3D scenes. One technique for rendering a stereoscopic image in the ODS format or VR180 format from a 3D scene is to perform slit rendering for each column of pixels. In other words, individual one-pixel wide narrow field-of-view images are rendered for each eye and each column of pixels in the image. Because of the number of renderings that must be performed using this technique, the performance may be inadequate and may preclude live streaming applications (e.g., rendering an ODS or VR180 format image using slit rendering may take a long time and may use a large amount processor cycles).

Returning now to FIG. 1, the stereoscopic rendering engine 120 may include a vertex offset engine 122 and a scene construction engine 124. The vertex offset engine 122 may adjust the positions of the vertices of a 3D scene generated by the 3D scene generation engine 118 so that the rendered scene appears as though the camera position has changed for each vertical columns of pixel of the image. In some implementations, the vertex offset engine 122 is implemented by instructions executed by one or more shaders of a GPU, such as a vertex shader or a geometry shader. The instructions may, for example, cause the vertex shader to calculate a point on a virtual pupillary circle of a virtual camera assembly at which a tangent ray intersect a specific vertex. Then, based on the identified point or tangent ray, an offset for the vertex may be calculated. In some implementations, the offset is applied to the vertex's position by the vertex shader of the GPU. For example, the offset may correspond to a vector between the identified point and the center of the virtual camera assembly 202 (i.e., the center of the pupillary circle).

In some implementations, one or more of the identified point, tangent ray, or offset are stored with the vertex and applied at a later rendering stage. For example, the vertices' positions may be adjusted by a geometry shader based on an offset (or identified point or tangent ray) calculated earlier by the vertex shader. In some implementations, a different point and a tangent ray are identified for each eye. Different offsets may then be calculated for each of the pupils and applied by the geometry shader during rendering of the images for each eye.

Figure 5:
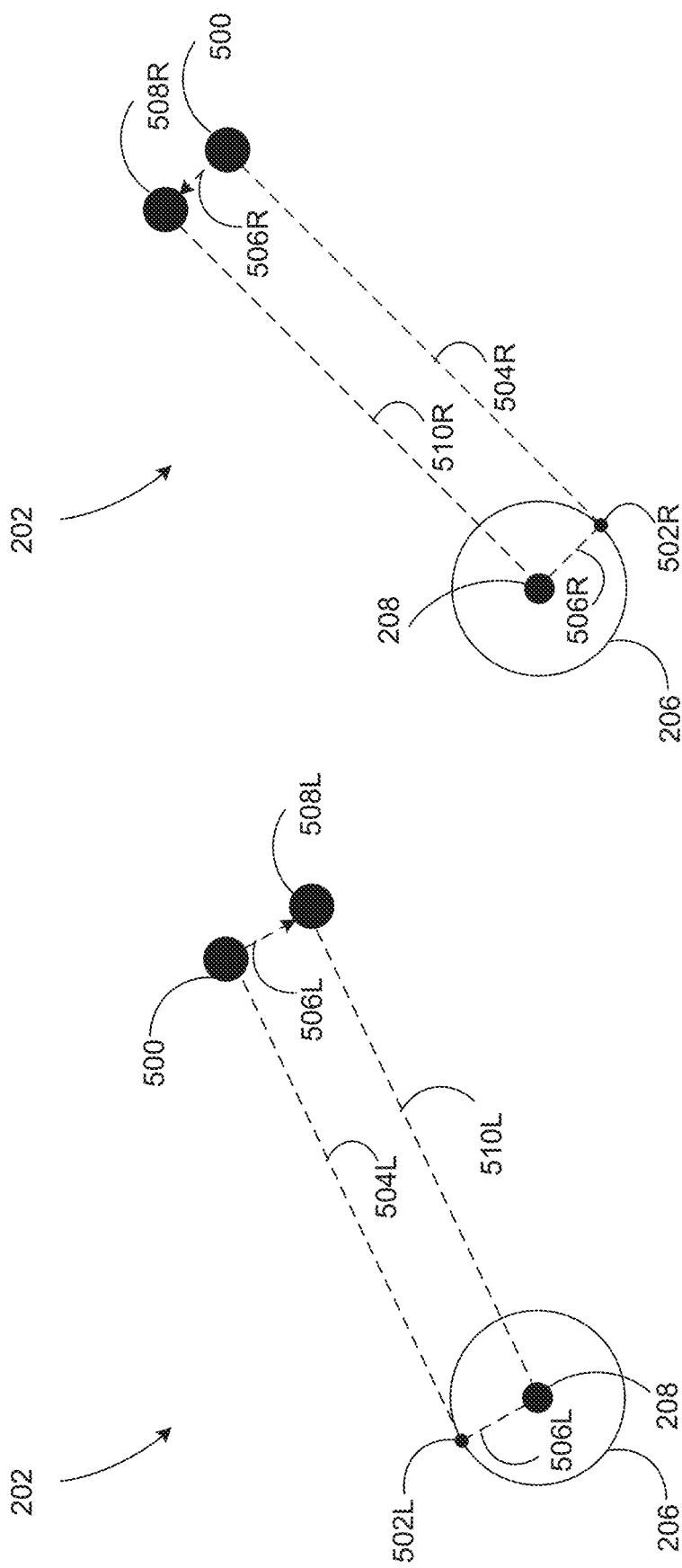
FIGS. 5A and 5B are schematic illustrations of applying an offset to a vertex of a 3D scene, in accordance with implementations described herein.

FIGS. 5A and 5B are schematic illustrations of applying an offset to a vertex 500 of a 3D scene. These offsets may be applied by a vertex shader in a GPU to render left eye and right eye portions of a stereoscopic image.

In FIG. 5A, the vertex 500 is offset, which is shown in the offset position as left vertex 508L, for rendering a left eye image portion. In this example, a left point 502L is identified along the virtual pupillary circle 206 at which a left tangent ray 504L intersects with the position of the vertex 500. The left tangent ray 504L is a clockwise-oriented ray that is tangent to the circle at the left point 502L. A left offset vector 506L is determined between the left point 502L and the center point 208 of the virtual pupillary circle 206. The left offset vector 506L can then be applied to the vertex 500 to determine where the left vertex 508L should be positioned. As can be seen, the left vertex 508L is disposed along a left offset ray 510L from the center point 208. The left offset ray 510L has the same angle with respect to the center 208 as the left tangent ray 504L has with respect to the left point 502L. Accordingly, rendering of the left vertex 508L from a camera disposed at the center point 208 will be the same as or nearly the same as rendering the vertex 500 from a camera disposed at the left point 502L.

In FIG. 5B, the vertex 500 is offset, which is shown in the offset position as right vertex 508R, for rendering a right eye image portion. In this example, a right point 502R is identified along the virtual pupillary circle 206 at which a right tangent ray 504R intersects with the position of the vertex 500. The right tangent ray 504R is a counter-clockwise-oriented ray that is tangent to the circle at the right point 502R. A right offset vector 506R is determined between the right point 502R and the center point 208 of the virtual pupillary circle 206. The right offset vector 506R can then be applied to the vertex 500 to determine where the right vertex 508R should be positioned. As can be seen, the right vertex 508R is disposed along a right offset ray 510R from the center point 208. The right offset ray 510R has the same angle with respect to the center 208 as the right tangent ray 504R has with respect to the right point 502R. Accordingly, rendering of the right vertex 508R from a camera disposed at the center point 208 will be the same as or nearly the same as rendering the vertex 500 from a camera disposed at the right point 502R.

By applying the offsets shown in FIGS. 5A and 5B, an ODS projection image, such as ODS format file or a VR180 format file, can be generated from a single camera position. Repositioning the vertices by the offsets adjusts the 3D scene for rendering from a single camera position and compensates for the changes in camera location that are typically needed to produce a stereoscopic directional projection. For example, the offsets are made to allow for rendering an image with a stereoscopic directional projection from a single camera position. These offsets may reduce the number of renderings need to capture stereoscopic content and thus reduces the number of processing cycles and time needed to capture the stereoscopic content.

Returning now to FIG. 1, the scene construction engine 124 may construct a modified scene based on a 3D scene generated by the 3D scene generation engine 118. For example, the scene construction engine 124 may duplicate and position geometric entities from the 3D scene so that a left-eye image portion and a right-eye image portion can be generated in a single rendering.

In some implementations, an ODS format file may be generated by duplicating geometric entities from the 3D scene at different vertical positions such that a first set of geometric entities is positioned for generating a left eye image portion and a second set of geometric entities is positioned for generating a right eye image portion. The first set of geometric entities may be vertically offset above the second set of geometric entities. Additionally, the scene construction engine 124 may clip any triangles from the first set of geometric entities that extend down into the right eye image portion. Similarly, the scene construction engine 124 may also clip any triangles from the second set of geometric entities that extend up into the left-eye image portion. After the triangles are duplicated and clipped, the vertices of the triangles may be repositioned based on a value calculated by the vertex offset engine 122.

Because the vertex offset engine 122 can be used to adjust the positions of the vertices, the 3D scene (or portions of the 3D scene) can be rendered without adjusting the position of the camera for each vertical column of pixels. Instead, the repositioned vertices have the same effect as constantly repositioning the camera would have had. Once the vertices are repositioned, the stereoscopic image can be captured with a single rendering or a small number of renderings per eye. This reduction in the number of renderings can significantly improve the performance. For example, using vertex offset engine 122 may reduce the amount of time needed to capture synthetic 3D content by a factor of more than 1000. Some implementations of the stereoscopic rendering engine 120 allow for real-time rendering of wide field of view stereoscopic content, including 360-degree stereoscopic content such as ODS format files.

The scene construction engine 124 may also duplicate triangles along the vertical edges onto the opposite vertical edges of the image portions so that the triangles extend across the edge of the 360-degree field of view when rendered. The scene construction engine 124 may also clip triangles along the vertical edges of the image portion.

In some implementations, a VR180 format file may be generated by duplicating geometric entities from the 3D scene at different horizontal positions such that a first set of geometric entities is positioned for generating a left eye image portion and a second set of geometric entities is positioned for generating a right eye image portion. The first set of geometric entities may be horizontally offset to the left of the second set of geometric entities. Additionally, the scene construction engine 124 may clip any triangles from the first set of geometric entities that extend over into the right eye image portion. Similarly, the scene construction engine 124 may also clip any triangles from the second set of geometric entities that extend over into the left-eye image portion. Similar to the ODS format file, after the triangles are duplicated and clipped, the vertices of the triangles may be repositioned based on a value calculated by the vertex offset engine 122.

The stereoscopic content capture computing device 102 may generate and output the stereoscopic content 110, which may be distributed or sent to one or more computing devices, such as the computing device 104, via the network 108. In an example implementation, the AR/VR content includes three-dimensional scenes and/or images. Additionally, the AR/VR content may include audio/video signals that are streamed or distributed to one or more computing devices. According to an illustrative example implementation, virtual reality (VR) may generate an immersive environment by, at least in some cases, replicating or simulating, to varying degrees, an environment or physical presence in places in the real world or imagined worlds or environments. Augmented reality (AR) may generate an immersive environment by, at least in some cases, overlaying computer generated images on a user's field of view of the real world.

The memory 112 can include one or more non-transitory computer-readable storage media. The memory 112 may store instructions and data that are usable to generate an immersive environment for a user.

The processor assembly 114 includes one or more devices that are capable of executing instructions, such as instructions stored by the memory 112, to perform various tasks, such as generating a 3D scene and rendering stereoscopic images. For example, the processor assembly 114 may include a central processing unit (CPU) and/or a graphics processor unit (GPU). For example, if a GPU is present, some image or video rendering tasks associated with generating the stereoscopic content may be performed by the GPU rather than the CPU.

The communication module 116 includes one or more devices for communicating with other computing devices, such as the computing device 104. The communication module 116 may communicate via wireless or wired networks.

In some implementations, the computing device 104 is a mobile device (e.g., a smartphone) which may be configured to provide or output stereoscopic content to generate an immersive AR/VR environment for a user. The computing device 104 may include a memory 130, a processor assembly 132, a communication module 134, a display device 136, and a sensor system 138. The memory 130 may include an AR/VR application 140. The memory 130 may also store the stereoscopic content 110 received from the stereoscopic content capture computing device 102. The computing device 104 may also include various user input components (not shown) such as a handheld electronic device that communicates with the computing device 104 using a wireless communications protocol.

The memory 130 may be similar to the memory 112 and may, for example, store instructions and data that are usable to display the stereoscopic content 110 in an immersive environment for a user. The processor assembly 132 may be similar to the processor assembly 114 and the communication module 134 may be similar to the communication module 116.

The display device 136 may, for example, include an LCD (liquid crystal display) screen, an OLED (organic light emitting diode) screen, a touchscreen, or any other screen or display for displaying images or information to a user. In some implementations, the display device 136 includes a light projector arranged to project light onto a portion of a user's eye.

The sensor system 138 may include various sensors, including an inertial motion unit (IMU) 142. Implementations of the sensor system 138 may also include different types of sensors, including, for example, a light sensor, an audio sensor, an image sensor, a distance and/or proximity sensor, a contact sensor such as a capacitive sensor, a timer, and/or other sensors and/or different combination(s) of sensors.

The IMU 142 detects motion, movement, and/or acceleration of the computing device 104 and/or the HIVID 106. The IMU 142 may include various types of sensors such as, for example, an accelerometer, a gyroscope, a magnetometer, and other such sensors. A position and orientation of the HIVID 106 may be detected and tracked based on data provided by the sensors included in the IMU 142. The detected position and orientation of the HIVID 106 may allow the system to in turn, detect and track the user's gaze direction and/or head movement.

The AR/VR application 140 may generate and present an immersive environment to a user via one or more output devices of the computing device 104 such as the display device 136, a speaker(s) (not shown), or other output devices. In some implementations, the AR/VR application 140 includes instructions stored in the memory 130 that, when executed by the processor assembly 132, cause the processor assembly 132 to perform the operations described herein. For example, the AR/VR application 140 may generate and present an immersive environment to the user based on, for example, AR/VR content, such as the stereoscopic content 110.

The stereoscopic content 110 may include 3D scenes that can be rendered as images or videos for display on the display device 136. For example, the 3D scene can include one or more objects represented as polygonal meshes. The polygonal meshes may be associated with various surface textures, such as colors and images. The 3D scene may also include other information such as, for example, light sources that are used in rendering the 3D scene.

The AR/VR application 140 may update the AR/VR environment based on input received from the IMU 142 and/or other components of the sensor system 138. For example, the IMU 142 may detect motion, movement, or acceleration of the computing device 104 or the HIVID 106. The IMU 142 may include various different types of sensors such as, for example, an accelerometer, a gyroscope, a magnetometer, and other such sensors. A position and orientation of the HMD 106 may be detected and tracked based on data provided by the sensors included in the IMU 142. The detected position and orientation of the HMD 106 may allow the system to in turn, detect and track the user's head direction and head movement. Based on the detected gaze direction and head movement, the AR/VR application 140 may update the AR/VR environment to reflect a changed orientation and/or position of the user within the environment. For example, the AR/VR application 140 may select and cause a portion of the stereoscopic content 110 to be displayed based on the detected head direction of the user.

Although the computing device 104 and the HIVID 106 are shown as separate devices in FIG. 1, in some implementations, the computing device 104 may include the HIVID 106. In some implementations, the computing device 104 communicates with the HIVID 106 via a cable, as shown in FIG. 1. For example, the computing device 104 may transmit video signals to the HIVID 106 for display for the user, and the HIVID 106 may transmit one or more of motion, position, and orientation information to the computing device 104. In some implementations, the HIVID 106 includes a chamber in which the computing device 104 may be placed. In some implementations, the user is able to view the display device 136 of the computing device 104 while wearing the HIVID 106 (e.g., through lenses or apertures within the HIVID 106). For example, the computing device 104 and the HIVID 106 can together function as a stereoscopic viewer by partitioning a screen of the display device 136 into a first image that is viewable by only the left eye of the user when viewed through the HIVID and a second image that is viewable by only the right eye of the user when viewed through the HIVID.

Although FIG. 1 shows the stereoscopic content capture computing device 102 being separate from the computing device 104, in some implementations the same computing device performs the operations of the stereoscopic content capture computing device 102 and the computing device 104.

The network 108 may be the Internet, a local area network (LAN), a wireless local area network (WLAN), and/or any other network.

Figure 6:
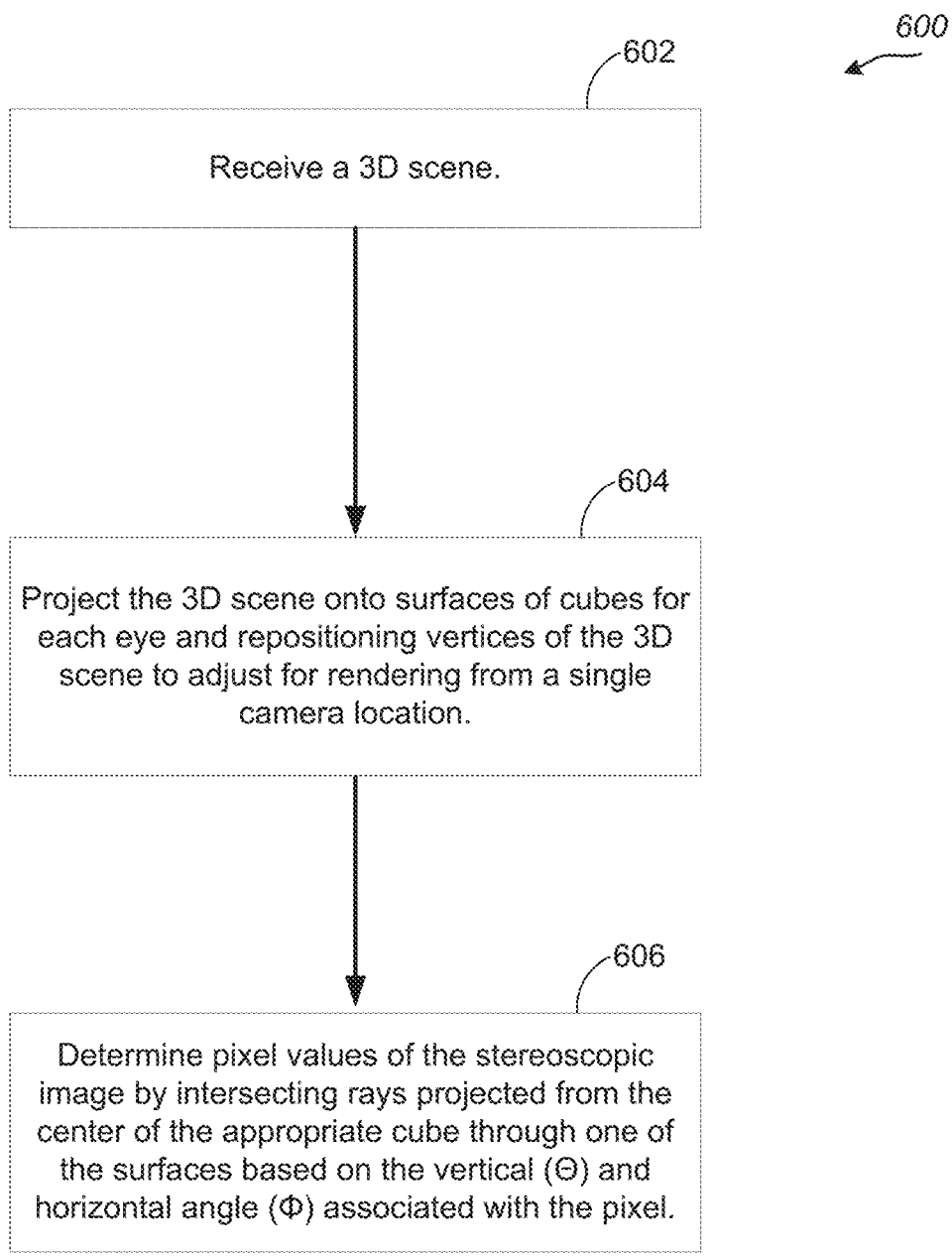
FIG. 6 is a diagram of an example method of capturing synthetic stereoscopic content, in accordance with implementations described herein.
Figure 7:
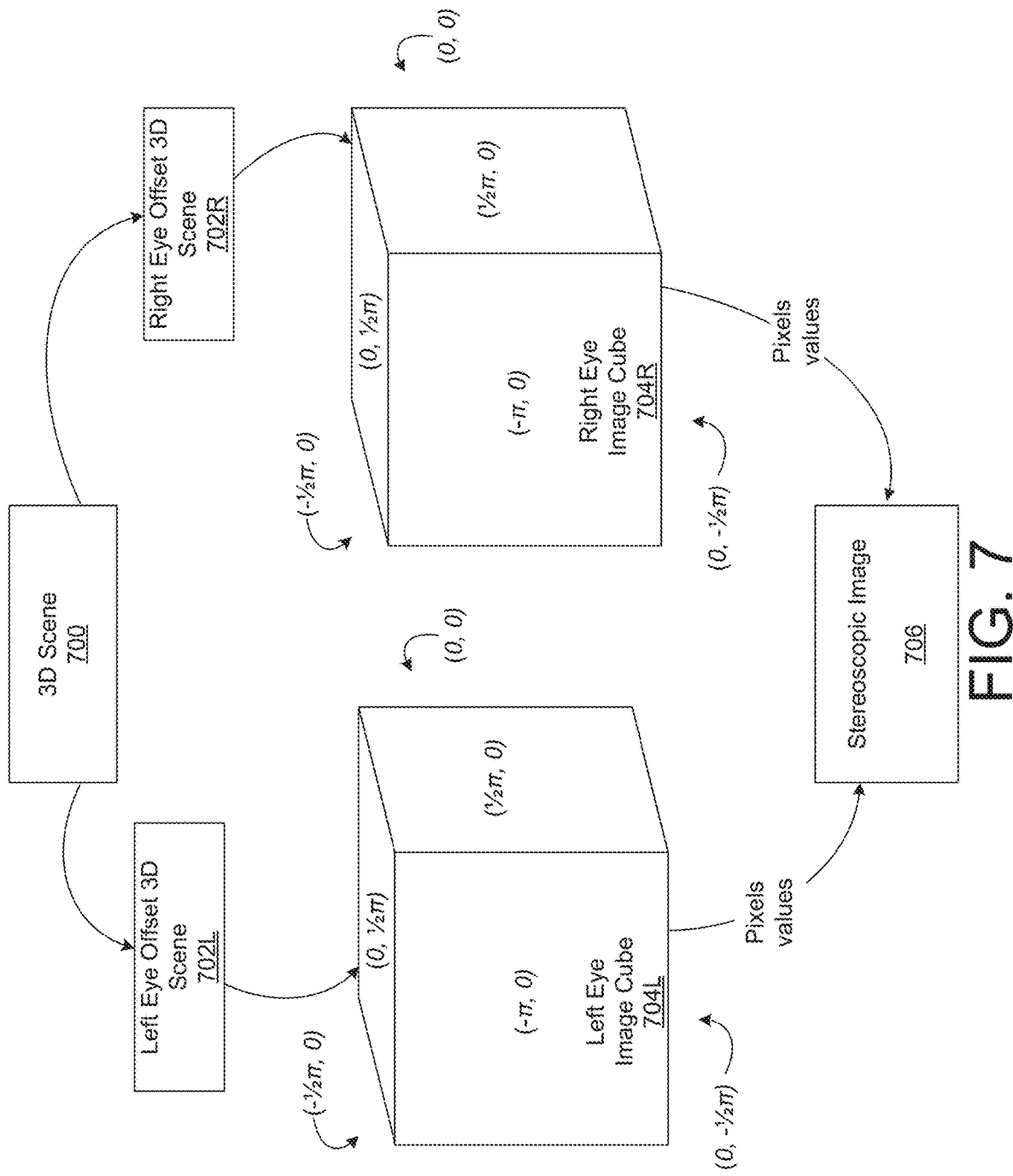
FIG. 7 is a schematic diagram of an example of projecting a 3D scene onto surfaces of a left eye image cube and a right eye image cube, in accordance with implementations described herein.

FIG. 6 is a diagram of an example method 600 of capturing synthetic stereoscopic content. This method 600 may for example be performed by the stereoscopic rendering engine 120. FIG. 7 is a schematic diagram of an implementation of the method 600 being used to generate a stereoscopic image 706.

At operation 602, a 3D scene is received. For example, the 3D scene may be received from the 3D scene generation engine 118. The 3D scene may, for example, include multiple geometric entities such as polygonal meshes that include multiple triangular faces that are defined by vertices.

At operation 604, the 3D scene is projected on surfaces of cubes for each eye. During the projection, the vertices of the 3D scene may be repositioned to adjust for projecting from a single camera location. As an example, the vertices may be offset as has been previously described. In some implementations, the vertices are repositioned during projection or rendering by a vertex shader of a GPU.

FIG. 7 shows an example of projecting a 3D scene 700 onto surfaces of a left eye image cube 704L and a right eye image cube 704R. The left eye image cube 704L and the right eye image cube 704R both include six surfaces, which are each labeled in FIG. 7 according to coordinates of a vector that is orthogonal to the surface. After projection of the scene, an image is formed on each of the surfaces of the image cubes that includes the content of the 3D scene that would be visible through the surface to a camera at the center of the associated image cube.

The images from the 3D scene 700 projected onto the left eye image cube 704L may be based on a left eye offset 3D scene 702L. The left eye offset 3D scene 702L may be generated by applying a vertex offset to each of the vertices in the 3D scene. In some implementations, an offset is applied by a vertex shader of a GPU as the vertex is being projected (or rendered) on the left eye image cube 704L. Similarly, the images from the 3D scene 700 projected onto the right eye image cube 704R may be based on a right eye offset 3D scene 702R.

At operation 606, pixel values of the stereoscopic image are determined by intersecting a ray projected from the center of the appropriate cube through one of the surfaces based on the vertical ($\Theta$) and horizontal angle ($\Phi$) associated with the pixel. In some implementations, the pixel values are determined by a fragment shader of a GPU. The fragment shader may, select the appropriate cube map based on whether a pixel is within a left eye image portion or a right eye image portion, calculate a direction vector (e.g., based on the vertical ($\Theta$) and horizontal angle ($\Phi$) associated with the pixel), and read the pixel value from a surface of the selected cube map.

Figure 8:
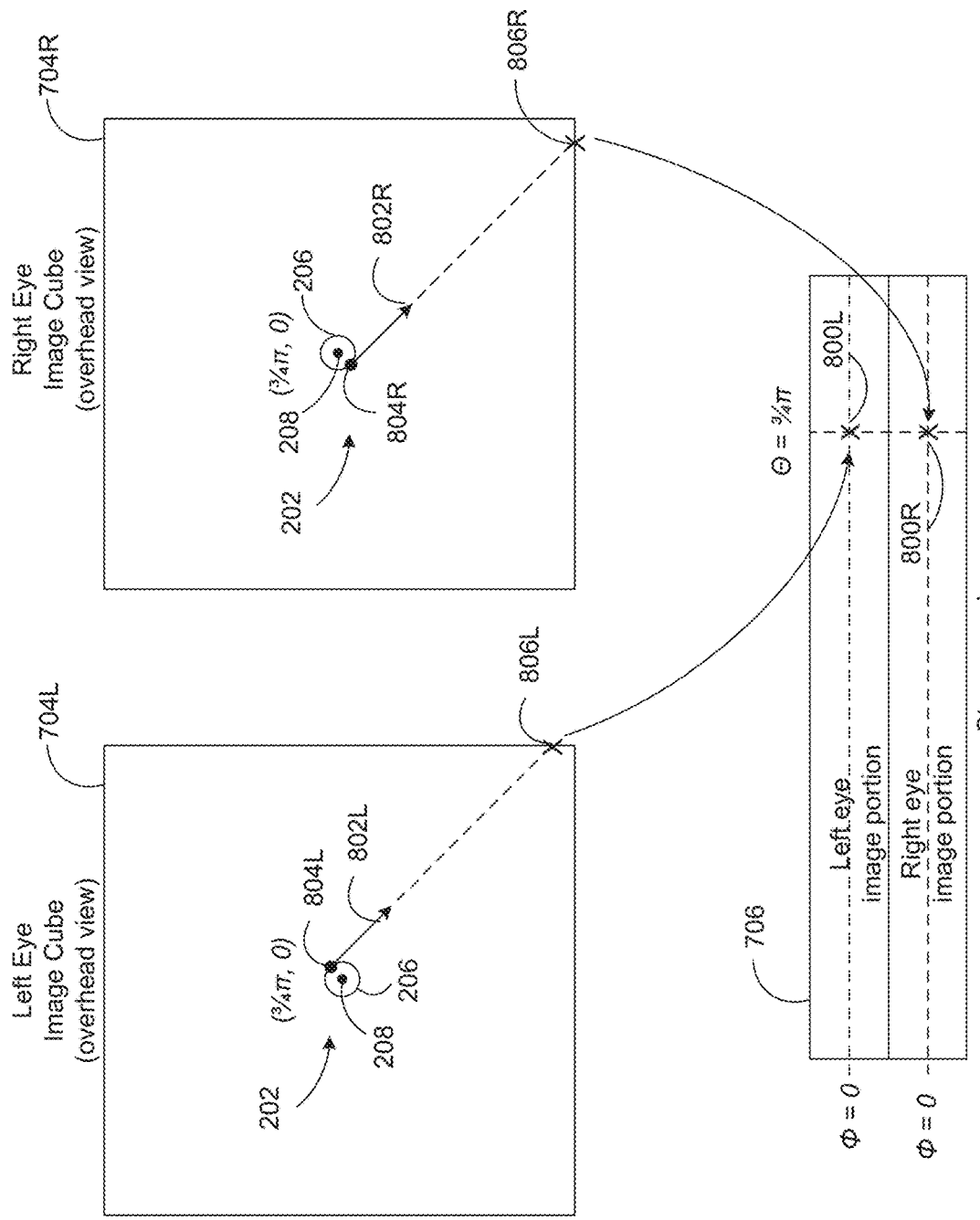
FIG. 8 is a schematic illustration of the process of reading values for pixels from image cube maps to generate a stereoscopic image, in accordance with implementations described herein.

In FIG. 7, a stereoscopic image 706 is generated by reading pixel values based on the pixel location of the stereoscopic image 706. FIG. 8 is a schematic illustration of the process of reading values for a pixel 800L and a pixel 800R from the left eye image cube map 704L and the right eye image cube 704R respectively to generate the stereoscopic image 706. The pixel 800L is from the left eye image portion of the stereoscopic image 706 and is located at a position associated with the vertical angle 0 and the horizontal angle $\frac{3}{4}\pi$. Because the pixel 800L is in the left eye image portion, the left eye image cube 704L is selected. Then, a left tangent ray 802L is projected from a point 804L on the virtual pupillary circle 206. The location of the point 804L and the direction of the left tangent ray 802L are determined based on the vertical angle and horizontal angle associated with the pixel 800L. An intersection point 806L is then found with a surface of the left eye image cube 704L.

The value for the pixel 800L can then be determined from the pixel of the image projected on the surface of the left eye image cube 704L identified at the intersection point 806L.

The value for the pixel 800R can be determined in a similar manner. In this example, the pixel 800L is from the right eye image portion of the stereoscopic image 706 and is located at a position associated with the vertical angle 0 and the horizontal angle ¾π. Because the pixel 800R is in the right eye image portion, the right eye image cube 704R is selected. Then, a right tangent ray 802R is projected from a point 804R on the virtual pupillary circle 206. The location of the point 804R and the direction of the right tangent ray 802R are determined based on the vertical angle and horizontal angle associated with the pixel 800R. An intersection point 806R is then found with a surface of the right eye image cube 704R. The value for the pixel 800R can then be determined from the pixel of the image projected on the surface of the right eye image cube 704R identified at the intersection point 806R.

In some implementations, the value for pixels of the stereoscopic image are read by projecting a ray out from the center point 208 of the virtual camera assembly at an angle determined based on the position of the pixel in the stereoscopic image. For example, the pixel 800L would be read by projecting a ray from the center point 208 at a vertical angle 0 and a horizontal angle ¾π into the left eye image cube 704L to identify the intersection point. Similarly, the pixel 800R would be read by projecting a ray from the center point 208 at a vertical angle 0 and a horizontal angle ¾π into the right eye image cube 704L to identify the intersection point.

Figure 9:
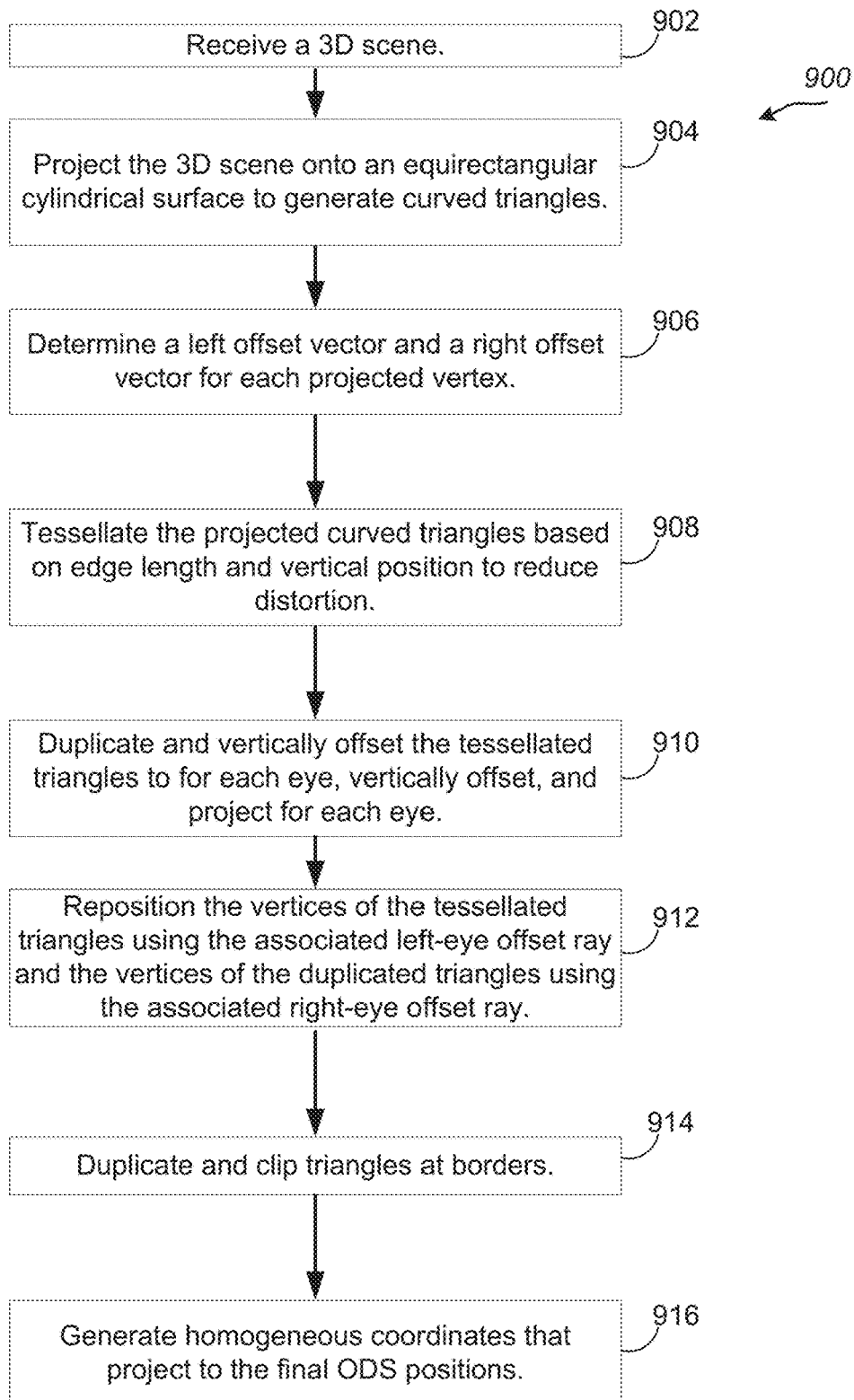
FIG. 9 is a diagram of an example method of capturing synthetic stereoscopic content, in accordance with implementations described herein.
Figure 10:
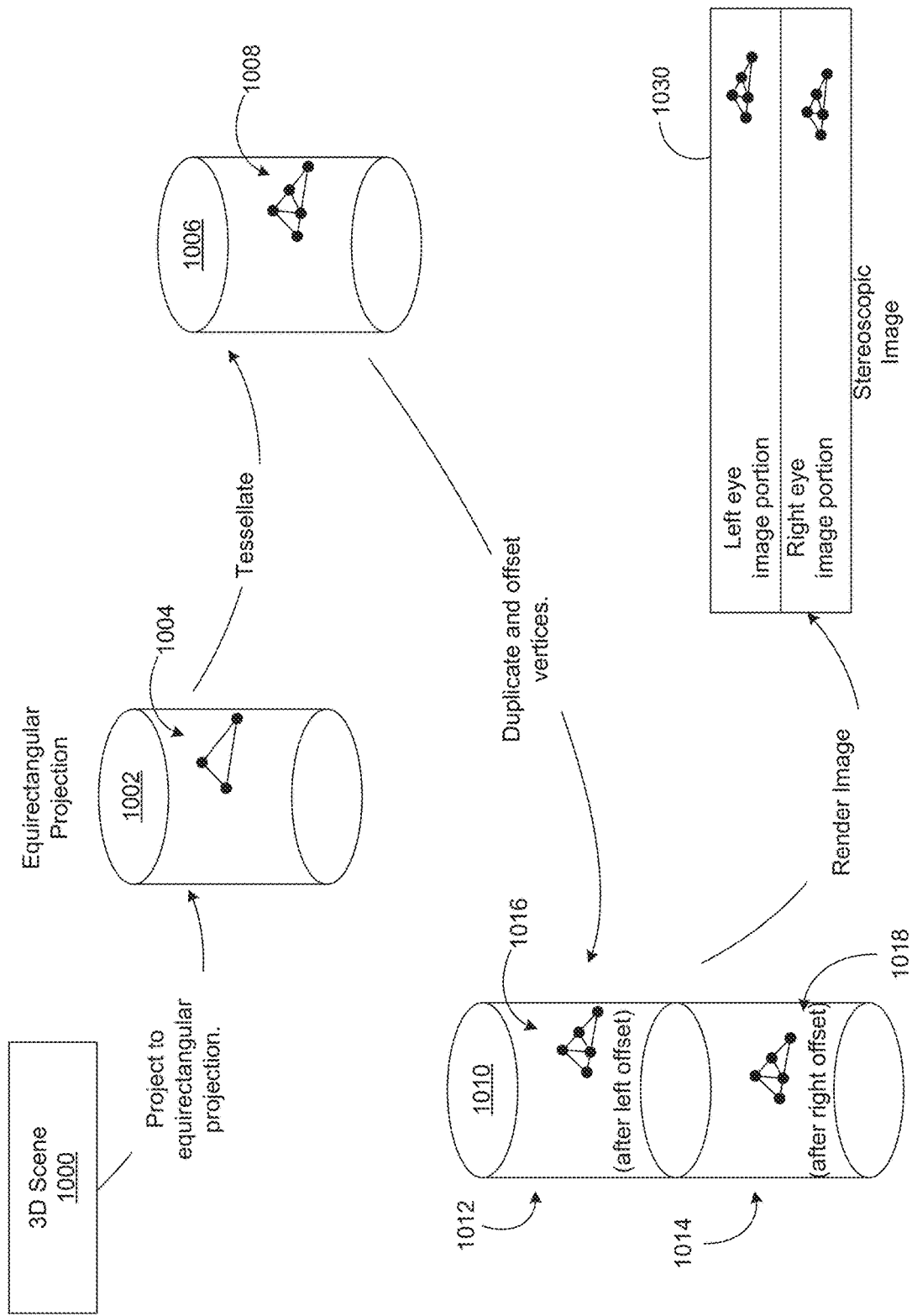
FIG. 10 is a schematic diagram of an example implementation of the method of FIG. 9 to generate a stereoscopic image.

FIG. 9 is a diagram of an example method 900 of capturing synthetic stereoscopic content. This method 900 may for example be performed by the stereoscopic rendering engine 120. FIG. 10 is a schematic diagram of an implementation of the method 900 being used to generate a stereoscopic image 1030.

At operation 902, a 3D scene is received. Operation 902 may be similar to operation 602, which has been previously described.

At operation 904, the 3D scene is projected onto an equirectangular cylindrical surface, which generates curved triangles. In some implementations, the projection is performed by determining an vertical and horizontal angle for a ray that starts at a camera position and passes through each vertex of the 3D scene. The vertex may then be mapped to a coordinate on a surface of a cylinder that has a vertical axis centered at the camera position. A depth coordinate may also be determined for the vertices. The depth coordinate may, for example, be determined based on the distance from the central axis of the cylinder to the vertex. In some implementations, all culling, including frustum culling, is disabled so that the entire 360-degrees of the scene is projected. Some implementations disable all culling except for depth culling.

FIG. 10 shows an example of projecting a 3D scene 1000 onto an equirectangular projection 1002. In this example, the 3D scene 1000 includes a curved triangle 1004, which is shown on the cylindrical surface of the equirectangular projection 1002.

Returning now to FIG. 9, at operation 906, a left offset vector and a right offset vector are determined for each projected vertex. Determining the left offset vector and the right offset vector may be based on an IPD parameter. For example, a value equal to half of the IPD may be used to determine the left offset vector and the right offset vector. The left offset vector and right offset vector may be determined as has been described previously with respect to at least FIGS. 5A and 5B. In some implementations, the left offset vector and the right offset vector are determined using a vertex shader of a GPU. In some implementations, shader instructions are provided to the vertex shader to implement the left offset vector and right offset vector determination. After being determined, the left offset vector and right offset vector may be stored with the vector.

At operation 908, the projected curved triangles are tessellated based on edge length and vertical position to reduce distortion. The triangles of the 3D scene are curved by the projection onto the equirectangular cylinder because, after projection, the edges of the triangles extend along the curved surface of the cylinder. These curved triangles may be flattened and distorted during rendering, which will result in flat triangles that have edges that do not follow the curved surface of the cylinder. To minimize distortion, the curved triangles may be tessellated to generate additional smaller triangles with more vertices that can be mapped to the curved surface of the cylinder. In some implementations, the curved triangles are tessellated based on the edge length of the triangle and the vertical position of the triangle. Because there may be more distortion near the top and the bottom of an equirectangular projection, the curved triangles near the top and bottom of the equirectangular projection may be tessellated more than curved triangles near the vertical middle of the equirectangular projection. In FIG. 10, the equirectangular projection 1006 illustrates an example of tessellated triangles 1008 based on the curved triangle 1004.

In some implementations, the projected curved triangles are tessellated by a hull shader and domain shader of a GPU. The projection of the triangles onto the equirectangular cylinder may produce non-linear Z/W values. In some implementations, the triangles are given tessellation factors that minimize interpolation error of the non-linear Z/W values and provide a good linear approximation of the edges. Some implementations include a quality level parameter which is used to specify an acceptable level of distortion.

At operation 910, the tessellated triangles are duplicated and vertically offset for each eye. For example, the tessellated triangles may be duplicated so that there is a first set of triangles for the left eye and a second set of triangles for the right eye. The first set of triangles may be vertically offset from the second set of triangles so that the first set of triangles are aligned with a left eye image portion of an equirectangular cylindrical projection and the second set of triangles are aligned with a right eye image portion of an equirectangular cylindrical projection. In at least some implementations, the tessellated triangles are duplicated and vertically offset by a geometry shader of a GPU.

At operation 912, reposition the vertices of the tessellated triangles using the associated left offset vector and the vertices of the duplicated triangles using the associated right-eye offset ray. Additionally, vertices of the first set of triangles may be offset according to the associated left offset vectors and the second set of triangles may be offset according to the associated right offset vectors. In at least some implementations, the vertices are repositioned by a geometry shader of a GPU.

In FIG. 10, an example equirectangular projection 1010 is shown. The equirectangular projection 1010 includes a left eye image portion 1012 and a right eye image portion 1014. In this example, a first set of triangles 1016 are disposed within the left eye image portion 1012 and a second set of triangles 1018 are disposed within the right eye image portion 1014. As can be seen, the first set of triangles 1016 is vertically offset from the second set of triangles 1018. Additionally, the vertices of the first set of triangles 1016 are offset based on the left offset vectors calculated in operation 906 and the second set of triangles 1016 are offset based on the right offset vectors calculated in operation 906. In this example, the offsets are exaggerated so that the differences are more readily apparent.

Returning now to FIG. 9, at operation 914, triangles disposed at the boundaries of the left eye image portion of the projection or the right eye image portion of the projection are duplicated and clipped. For example, a triangle that extends across a boundary becomes two triangles and the vertices are transformed so that the hardware will clip them properly at the image boundaries.

At operation 916, homogeneous coordinates are generated that project to the final ODS positions. For example, the homogeneous coordinates may be generated by mapping the projected position on the cylinder to the corresponding location within a stereoscopic image. Additionally, Z and W coordinate values are also determined for each of the vertices based on distance from the central axis of the cylinder to the vertex. The depth values may, for example, be determined so that depth is planar and so that GPU Z-buffering will function.

In FIG. 10, the stereoscopic image 1030 is shown after projection into the final ODS positions. The stereoscopic image 1030 is formed by essentially unrolling the cylinder of the equirectangular projection along a vertical line. As discussed with respect to 914, any triangles that cross the vertical line which forms the edge of the ODS projection are duplicated so that they will show up on both ends of the ODS image.

The method 900 described above captures 360-degree synthetic ODS format content with a single render providing orders of magnitude performance improvement over conventional techniques. Some embodiments are capable of running in less than 30 milliseconds per frame in the presence of other system workloads.

Although the example method 900 captures ODS format content, other implementations can capture other synthetic content in other formats. For example, in some implementations, VR180 format content can be created using a method that is similar to the method 900. In some implementations that render VR180 content, the frustum culling is used to cull triangles that are outside of the 180 degree field of VR180 content. Additionally, duplicated vertices are offset side-by-side rather than in vertical offset. Additionally, triangles are not duplicated across the vertical edges of the image as the VR180 content does not wrap around.

Although this disclosure primarily discusses generating stereoscopic 360-degree content in the ODS format, some embodiments render stereoscopic 360-degree content in other formats too such as a stereo anaglyph. Stereoscopic content that is captured as described herein may be free of stitching artifacts as the complete scene is rendered in a single pass. In some embodiments, post-processing filters are applied after the rendering process to increase the synthetic content's visual fidelity.

Figure 11:
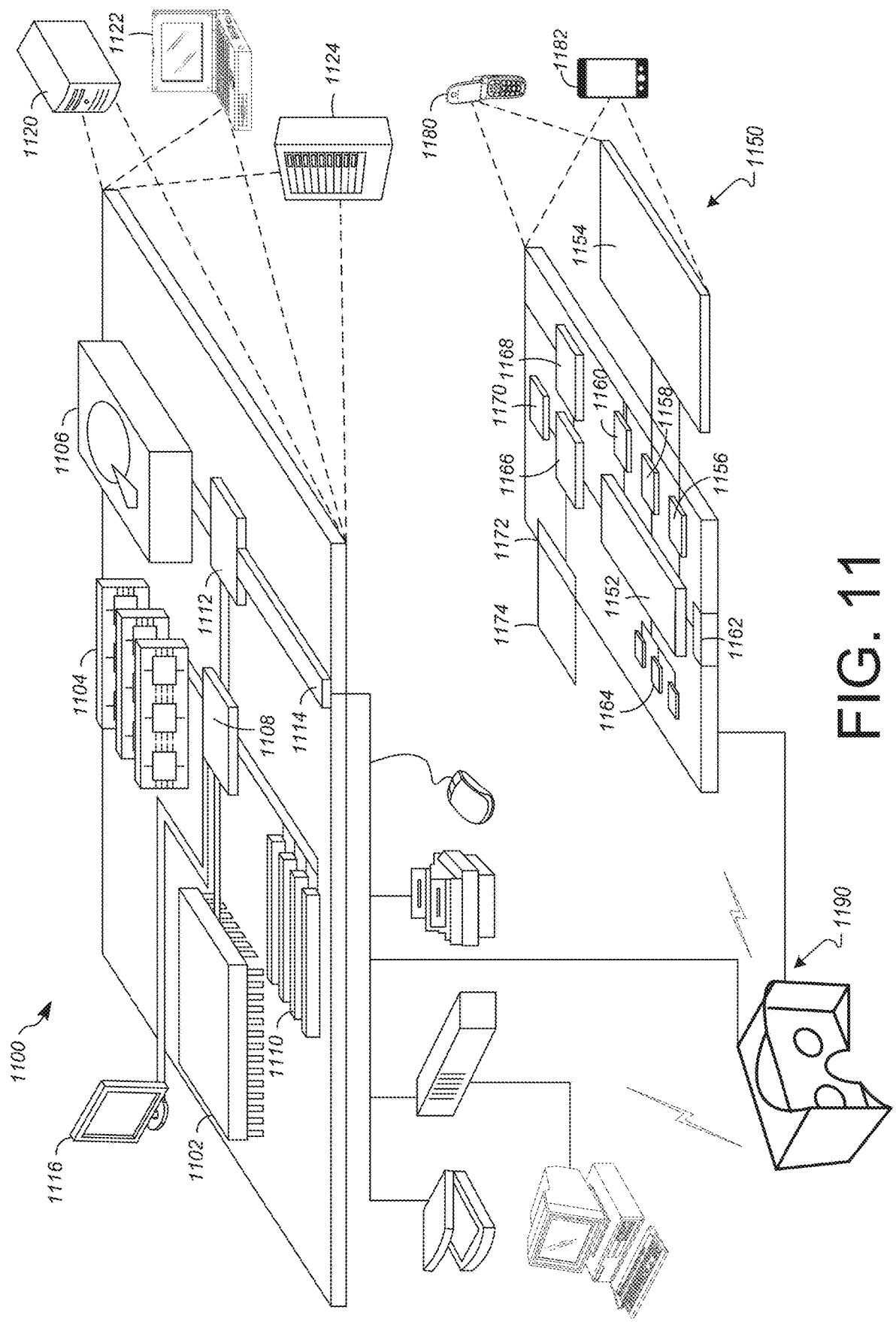
FIG. 11 shows an example of a computer device and a mobile computer device that can be used to implement the techniques described herein.

FIG. 11 shows an example of a computer device 1100 and a mobile computer device 1150, which may be used with the techniques described here. Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 1 can include sensors that interface with a virtual reality (VR headset/HIVID device 1190) to generate an immersive environment for viewing stereoscopic content. For example, one or more sensors included on a computing device 1150 or other computing device depicted in FIG. 1, can provide input to VR headset 1190 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1150 can use the sensors to determine an absolute position and/or a detected rotation of the computing device in the VR space that can then be used as input to the VR space. For example, the computing device 1150 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1150 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1150 when the computing device is incorporated into the VR space can cause a particular action to occur in the VR space.

In some implementations, a touchscreen of the computing device 1150 can be rendered as a touchpad in VR space. A user can interact with the touchscreen of the computing device 1150. The interactions are rendered, in VR headset 1190 for example, as movements on the rendered touchpad in the VR space. The rendered movements can control virtual objects in the VR space.

In some implementations, one or more output devices included on the computing device 1150 can provide output and/or feedback to a user of the VR headset 1190 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1150 may appear as another object in a computer-generated, 3D environment. Interactions by the user with the computing device 1150 (e.g., rotating, shaking, touching a touchscreen, swiping a finger across a touch screen) can be interpreted as interactions with the object in the VR space. In the example of the laser pointer in a VR space, the computing device 1150 appears as a virtual laser pointer in the computer-generated, 3D environment. As the user manipulates the computing device 1150, the user in the VR space sees movement of the laser pointer. The user receives feedback from interactions with the computing device 1150 in the VR environment on the computing device 1150 or on the VR headset 1190.

In some implementations, a computing device 1150 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1100 is intended to represent various forms of digital computers and devices, including, but not limited to laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device comprising:
   at least one processor; and
   memory storing instructions that, when executed by the at least one processor, cause the computing device to:
   receive a three-dimensional scene;
   project at least a portion of the three-dimensional scene onto an equirectangular cylindrical projection;
   determine left offset vectors and right offset vectors for vertices of the three-dimensional scene;
   duplicate the projected three-dimensional scene to form a left scene and a right scene,
   reposition vertices of the three-dimensional scene, wherein the repositioning comprises offsetting the vertices of the left scene using the left offset vectors and offsetting the right scene using the right offset vectors; and
   generate a stereoscopic image based on the repositioned vertices.

2. The computing device of claim 1, wherein the at least one processor includes a graphics processing unit and the instructions further cause the computing device to reposition the vertices using a vertex shader of the graphics processing unit.

3. The computing device of claim 1, wherein the instructions further cause the computing device to tessellate the three-dimensional scene using a hull shader and domain shader of a graphics processing unit.

4. The computing device of claim 3, wherein the instructions further cause the computing device to determine a tessellation factor based on edge lengths of triangles of the three-dimensional scene.

5. The computing device of claim 3, wherein the instructions further cause the computing device to determine a tessellation factor based on vertical positions of triangles of the three-dimensional scene.

6. The computing device of claim 1, wherein the instructions that cause the computing device to generate a stereoscopic image based on the repositioned vertices cause the computing device to:
   project at least a portion of the repositioned vertices onto an image cube; and
   use the projected vertices to generate the stereoscopic image.

7. A method comprising:
   receiving, at a processor, a three-dimensional scene;
   projecting, by the processor, at least a portion of the three-dimensional scene onto an equirectangular cylindrical projection;
   determining, by the processor, left offset vectors and right offset vectors for vertices of the three-dimensional scene;
   duplicating, by the processor, the projected three-dimensional scene to form a left scene and a right scene;
   repositioning, by the processor, vertices of the three-dimensional scene to compensate for variations in camera location in a directional stereoscopic projection, wherein the repositioning comprises offsetting the vertices of the left scene using the left offset vectors and offsetting the right scene using the right offset vectors; and
   generating, by the processor, a stereoscopic image based on the repositioned vertices.

8. The method of claim 7, wherein the processor includes a graphics processing unit and instructions to cause the processor to reposition the vertices using a vertex shader of the graphics processing unit.

9. The method of claim 7, wherein the processor includes instructions to cause the processor to tessellate the three-dimensional scene using a hull shader and domain shader of a graphics processing unit.

10. The method of claim 9, wherein the processor includes instructions to cause the processor to determine a tessellation factor based on edge lengths of triangles of the three-dimensional scene.

11. The method of claim 9, wherein the processor includes instructions to cause the processor to determine a tessellation factor based on vertical positions of triangles of the three-dimensional scene.

12. The method of claim 7, wherein the processor includes instructions to cause the processor to generate a stereoscopic image based on the repositioned vertices by:
    projecting at least a portion of the repositioned vertices onto an image cube; and
    using the projected vertices to generate the stereoscopic image.

13. A non-transitory computer-readable storage medium comprising instructions stored thereon that, when executed by at least one processor, are configured to cause a computing system to at least:
    receive a three-dimensional scene;
    project at least a portion of the three-dimensional scene onto an equirectangular cylindrical projection;
    determine left offset vectors and right offset vectors for vertices of the three-dimensional scene;
    duplicate the projected three-dimensional scene to form a left scene and a right scene,
    reposition vertices of the three-dimensional scene to compensate for variations in camera location in a directional stereoscopic projection, wherein the repositioning comprises offsetting the vertices of the left scene using the left offset vectors and offsetting the right scene using the right offset vectors; and
    generate a stereoscopic image based on the repositioned vertices.

14. The non-transitory computer-readable storage medium of claim 13, wherein the at least one processor includes a graphics processing unit and the instructions further cause the computing system to reposition the vertices using a vertex shader of the graphics processing unit.

15. The non-transitory computer-readable storage medium of claim 13, wherein the instructions further cause the computing system to tessellate the three-dimensional scene using a hull shader and domain shader of a graphics processing unit.

16. The non-transitory computer-readable storage medium of claim 15, wherein the instructions further cause the computing system to determine a tessellation factor based on edge lengths of triangles of the three-dimensional scene.

17. The non-transitory computer-readable storage medium of claim 15, wherein the instructions further cause the computing system to determine a tessellation factor based on vertical positions of triangles of the three-dimensional scene.

\* \* \* \* \*